United States Patent
Cha et al.

(10) Patent No.: US 9,436,297 B2
(45) Date of Patent: Sep. 6, 2016

(54) METHOD FOR REMOTE-CONTROLLING TARGET APPARATUS USING MOBILE COMMUNICATION TERMINAL AND REMOTE CONTROL SYSTEM THEREOF

(71) Applicant: Samsung Electronics Co., Ltd., Gyeonggi-do (KR)

(72) Inventors: Jae-Hyeok Cha, Gyeonggi-do (KR); Tae-Jeong Bae, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/005,637

(22) Filed: Jan. 25, 2016

(65) Prior Publication Data

US 2016/0139688 A1    May 19, 2016

Related U.S. Application Data

(63) Continuation of application No. 12/246,104, filed on Oct. 6, 2008, now Pat. No. 9,244,537.

(30) Foreign Application Priority Data

Oct. 4, 2007    (KR) ........................ 10-2007-0100053

(51) Int. Cl.
     *G06F 3/0354*      (2013.01)
     *G06F 1/16*      (2006.01)

(52) U.S. Cl.
     CPC ........... *G06F 3/0354* (2013.01); *G06F 1/1694* (2013.01)

(58) Field of Classification Search
None
See application file for complete search history.

(56) References Cited

U.S. PATENT DOCUMENTS

| | | | |
|---|---|---|---|
| 7,702,608 B1* | 4/2010 | Bererton ................. | A63F 13/06 463/37 |
| 9,067,132 B1* | 6/2015 | Bergeron ................ | A63F 13/00 |
| 2006/0092866 A1* | 5/2006 | Kim ...................... | G06F 1/1626 370/310 |
| 2007/0293261 A1 | 12/2007 | Chung | |
| 2008/0318679 A1* | 12/2008 | Tran ..................... | A43B 3/0005 463/39 |
| 2009/0048021 A1* | 2/2009 | Lian ....................... | A63F 13/06 463/37 |
| 2010/0171691 A1* | 7/2010 | Cook .................... | G06F 1/1613 345/156 |
| 2012/0044363 A1* | 2/2012 | Lu ......................... | H04N 5/2226 348/207.1 |
| 2012/0250940 A1* | 10/2012 | Kasahara .............. | G06T 19/006 382/103 |
| 2014/0176809 A1* | 6/2014 | Chen ................. | H04N 21/42222 348/734 |
| 2014/0376773 A1* | 12/2014 | Holz .................. | G06K 9/00342 382/103 |

FOREIGN PATENT DOCUMENTS

| | | |
|---|---|---|
| JP | 2004-334903 | 11/2004 |
| KR | 1020060025852 | 3/2006 |
| KR | 1020060039144 | 5/2006 |
| KR | 1020070068692 | 7/2007 |
| TW | 096130277 | 8/2007 |

\* cited by examiner

*Primary Examiner* — James A Thompson
(74) *Attorney, Agent, or Firm* — The Farrell Law Firm, P.C.

(57) ABSTRACT

Methods and apparatuses are provided for remote-controlling a target apparatus using a mobile communication terminal. A communication link is established with the target apparatus having a display screen adapted to visualize an object. An amount of displacement of the mobile communication terminal is detected. Motion information is generated using the amount of displacement of the mobile communication terminal. The motion information is transmitted to the target apparatus. The motion information corresponds to movement data of the object and the amount of displacement is detected based on at least one of current position information, acceleration information and angular velocity information of the mobile communication terminal.

17 Claims, 9 Drawing Sheets

METHOD FOR REMOTE-CONTROLLING TARGET APPARATUS USING MOBILE COMMUNICATION TERMINAL AND REMOTE CONTROL SYSTEM THEREOF

PRIORITY

This application is a Continuation Application of U.S. application Ser. No. 12/246,104, filed in the U.S. Patent and Trademark Office on Oct. 6, 2008, which claims priority under 35 U.S.C. §19(a) to a Korean Patent Application filed in the Korean Intellectual Property Office on Oct. 4, 2007 and assigned Ser. No. 10-2007-0100053, the disclosures of which are incorporated herein by reference.

BACKGROUND OF THE INVENTION

1. Field of the Invention

The present invention relates to a remote control method for remote-controlling a target apparatus using a mobile communication terminal, and a remote control system thereof.

2. Description of the Related Art

Recently, as the Liquid Crystal Display (LCD) equipped with electronics devices becomes bigger, the size of the monitor of a Personal Computer (PC) and the like also increases in size. In addition, it is possible to display hologram or lifelike broadcasting in a three-dimensional (3D) manner using the monitor of the PC.

Meanwhile, a technology has been developed that uses a mobile communication terminal as an input device, in place of a mouse which is an input device of the PC. A conventional mobile communication terminal which remote-controls the PC, merely performs an On/Off or Hot-key function of the PC, or moves a pointer displayed on a display screen using a 4-way key. Particularly, since the technology of controlling the PC using the mobile communication terminal has restrictions on the number of functions, it was difficult to fully control the PC without the mouse separately connected thereto.

SUMMARY OF THE INVENTION

An aspect of the present invention is to address at least the problems and/or disadvantages and to provide at least the advantages described below. Accordingly, an aspect of the present invention is to provide a remote control method for remote-controlling a target apparatus that displays a 3D display screen, using a mobile communication terminal, and a remote control system thereof.

According to an aspect of the present invention, a mobile communication terminal is provided that includes a motion sensor, and a transceiver configured for communication with a target apparatus including a display screen. The mobile communication terminal also includes a processing unit configured to establish, via the transceiver, a communication link with the target apparatus having the display screen adapted to visualize an object, detect an amount of displacement of the mobile communication terminal, via the motion sensor, generate motion information using the amount of displacement of the mobile communication terminal, and transmit the motion information to the target apparatus. The motion information corresponds to movement data of the object and the amount of displacement is detected based on at least one of current position information, acceleration information and angular velocity information of the mobile communication terminal.

According to another aspect of the present invention, a remote control method is provided for remote-controlling a target apparatus using a mobile communication terminal. A communication link is established with the target apparatus having a display screen adapted to visualize an object. An amount of displacement of the mobile communication terminal is detected. Motion information is generated using the amount of displacement of the mobile communication terminal. The motion information is transmitted to the target apparatus. The motion information corresponds to movement data of the object and the amount of displacement is detected based on at least one of current position information, acceleration information and angular velocity information of the mobile communication terminal.

According to another aspect of the present invention, a target apparatus is provided that is remote-controlled by a mobile communication terminal. The target apparatus includes a transceiver configured for communication with the mobile communication terminal. The target apparatus also includes a display to visualize an object. The target apparatus further includes a processing unit configured to establish, via the transceiver, a communication link with the mobile communication terminal, receive data corresponding to an amount of displacement of the mobile communication terminal, generate motion information using the amount of displacement of the mobile communication terminal, and move the object according to the motion information. The motion information corresponds to movement data of the object, and the amount of displacement is detected based on at least one of current position information, acceleration information and angular velocity information of the mobile communication terminal.

According to another aspect of the present invention, a remote control method is provided for remote-controlling a target apparatus using a mobile communication terminal. A communication link is established with the mobile communication terminal. Data is received corresponding to an amount of displacement of the mobile communication terminal. Motion information generated using the amount of displacement of the mobile communication terminal is generated. An object displayed on a display of the target apparatus is moved according to the motion information. The motion information corresponds to movement data of the object, and the amount of displacement is detected based on at least one of current position information, acceleration information and angular velocity information of the mobile communication terminal

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS

Figure 1:
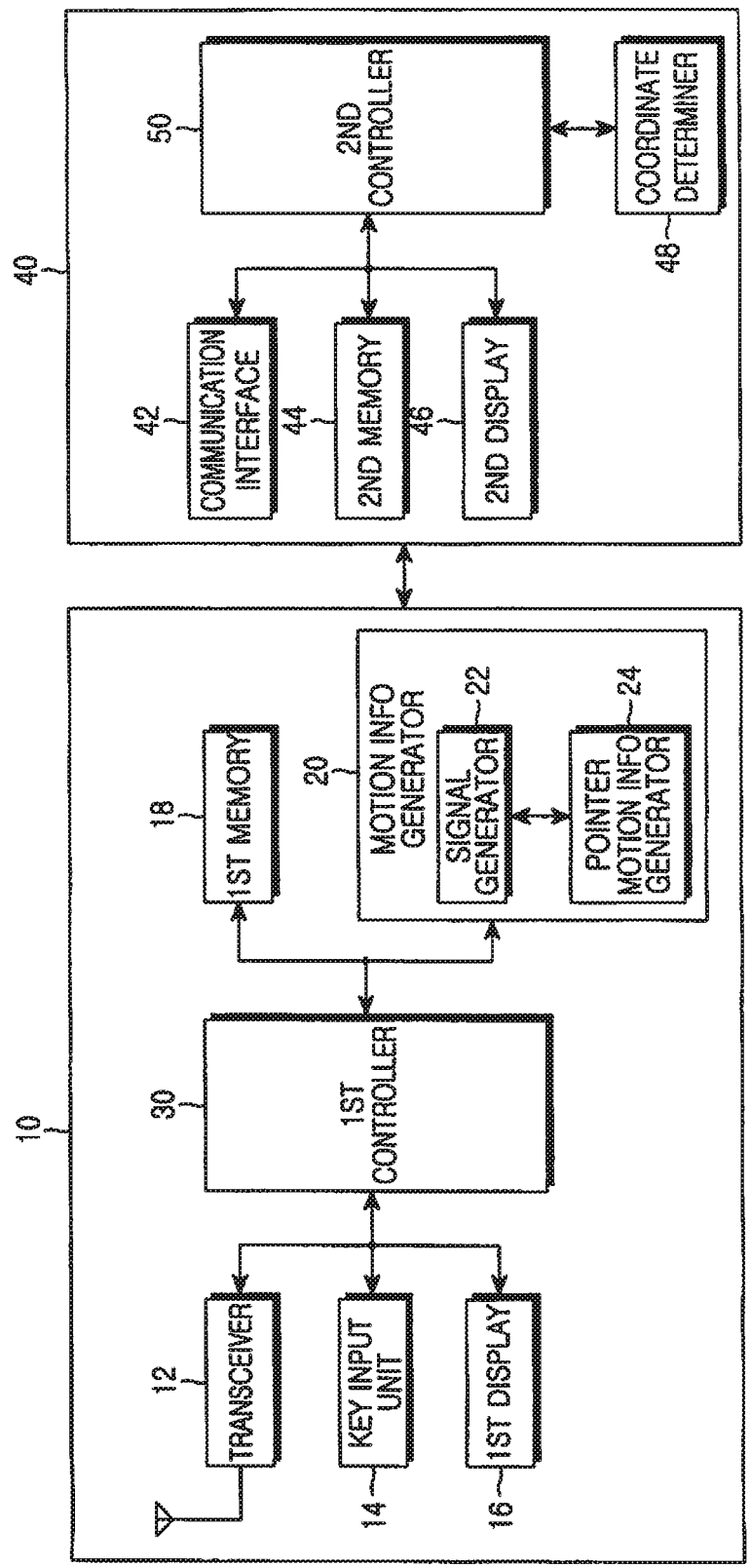
FIG. 1 is a block diagram illustrating a schematic structure of a remote control system according to an embodiment of the present invention.

Preferred embodiments of the present invention will now be described in detail with reference to the annexed drawings. In the drawings, the same or similar elements are denoted by the same reference numerals even though they may be depicted in different drawings. In the following description, a detailed description of known functions and configurations incorporated herein has been omitted for clarity and conciseness.

In the following description, the target apparatus is assumed to be a Personal Computer (PC). However, the target apparatus may include any device having a two-dimensional (2D) or three-dimensional (3D) display screen, as well as a PC.

FIG. 1 is a block diagram illustrating a schematic structure of a remote control system according to a preferred embodiment of the present invention.

The remote control system includes a mobile communication terminal 10 and a PC 40, and the mobile communication terminal 10 and the PC 40 are wire/wireless-connected to each other to exchange data.

The mobile communication terminal 10 includes a Radio Frequency (RF) unit (not shown), a transceiver 12, a key input unit 14, a first display 16, a first memory 18, a motion information generator 20, and a first controller 30.

The RF unit performs a wireless communication function of the mobile communication terminal 10. The RF unit includes an RF transmitter (not shown) for frequency up-converting and amplifying a transmission signal, and an RF receiver (not shown) for low-noise-amplifying and frequency down-converting a received signal.

The transceiver 12 transmits a signal generated in a signal generator 22 to the PC 40, and receives a radio signal generated in the PC 40. The transceiver 12 transmits, to the PC 40, an initialization signal, a motion signal, and pointer motion information, generated in the signal generator 22. The transceiver 12 receives an initialization response signal and a motion response signal, generated in the PC 40.

The key input unit 14 includes alphanumeric keys capable of receiving numerals, characters and function keys for setting various functions, and receives inputs from a user.

According to a preferred embodiment of the present invention, the key input unit 14 can receive from the user a key input for carrying out a remote control mode of the mobile communication terminal 10. In the remote control mode, the key input unit 14 can receive a key input for performing an operation corresponding to a position pointed by a pointer of the PC 40. A Hot-key function can be set in the key input unit 14. In this case, if a numeric/character key input is received through the key input unit 14, a particular function of the PC 40, which is set in the corresponding numeric/character key, can be immediately performed.

The first display 16, which can be an LCD, outputs various display data generated by the mobile communication terminal 10. When the LCD is a touch screen, the first display 16 can also serve as an input means.

The first memory 18 can be composed of a program memory and a data memory. Various information necessary for controlling an operation of the mobile communication terminal 10 is stored in the first memory 18.

According to a preferred embodiment of the present invention, data is generated and stored in the first memory 18 when the mobile communication terminal 10 executes the remote control mode, such as: (i) reference point coordinates of the PC 40, (ii) a position value of the mobile communication terminal 10 corresponding to the reference point coordinates, (iii) display information of the PC 40, (iv) an angular velocity of the mobile communication terminal 10 calculated by a gyro sensor, (v) an acceleration of the mobile communication terminal 10 calculated by an acceleration sensor, (vi) a current position value of the mobile communication terminal 10 calculated by a position sensor, and (vii) motion point coordinates of the PC 40 corresponding to the current position value.

The motion information generator 20 generates motion information, which is information indicating how the pointer of the PC 40 will move on the display screen of the PC 40 in response to movement of the mobile communication terminal 10. For this, the motion information generator 20 includes the signal generator 22 and a pointer motion information generator 24.

The signal generator 22 generates the signals necessary when the mobile communication terminal 10 carries out the remote control mode. When the mobile communication terminal 10 executes the remote control mode by the controller 30 or upon receipt of a user input, the signal generator 22 generates an initialization signal to set reference point coordinates of the PC 40. The term "reference point coordinates" refers to coordinates of the point where a communication interface 42 of the PC 40 has received the initialization signal. The signal generator 22 generates an initialization signal that includes data indicating the execution of the remote control mode, and data for requesting coordinates of the reference point which is a point where the initialization signal has arrived.

According to a preferred embodiment of the present invention, if the position of the mobile communication terminal 10 is changed by the user while executing the remote control mode, the signal generator 22 generates a motion signal for moving the pointer of the PC 40 according to the movement of the mobile communication terminal 10. The signal generator 22 generates the motion signal that includes (i) data for requesting coordinates of the motion point which is the point where the initialization signal has arrived at the PC 40, (ii) a current position value based on the movement of the mobile communication terminal 10, and (iii) acceleration and angular velocity of the mobile communication terminal 10 obtained when it moves from the previous position to the current position.

In addition, according to another preferred embodiment of the present invention, the signal generator 22 can generate a periodic signal. As the signal generator 22 generates the periodic signal, the first controller 30 can measure the time required when the initialization signal or the motion signal, transmitted from the signal generator 22 to the PC 40, comes back to the mobile communication terminal 10 after being processed into an initialization response signal or a motion response signal by the PC 40. The first controller 30 measures a round-trip time of the initialization signal, and stores it in the first memory 18. Thereafter, the first controller 30 measures a round-trip time of the motion signal based on the movement of the mobile communication terminal 10, and compares it with the round-trip time of the initialization signal. As a result, the first controller 30 can determine if the distance from the PC 40 is shorter or longer than as compared with when the mobile communication terminal 10, which has generated the motion signal, transmitted the initialization signal.

The pointer motion information generator 24 generates pointer motion information which is the information for moving the pointer of the PC 40 according to the movement of the mobile communication terminal 10. The pointer motion information generator 24, under the control of the controller 30, calculates distance, velocity and angle at which the pointer of the PC 40 should move on the display screen of the PC 40 according to the movement of the mobile communication terminal 10.

According to the present invention, the motion information generator 20, which includes an acceleration sensor, a gyro sensor and a position sensor, can sense acceleration, angular velocity, and position of the mobile communication terminal 10 due to the movement of the mobile communication terminal 10 by the user. The acceleration sensor is a sensor for measuring an acceleration of an object by sensing dynamic power of acceleration, vibration, impact, etc. The gyro sensor is a sensor for sensing an angular velocity that acts in the inertial system. The position sensor, which can be, for example, a Global Positioning System (GPS), senses a correct position every time the mobile communication terminal 10 moves by the user.

The first controller 30 controls the overall operation of the mobile communication terminal 10. According to a preferred embodiment of the present invention, when a user input for the remote control mode is received through the key input unit 14, the first controller 30 switches the mode of the mobile communication terminal 10 to the remote control mode. In addition, when a user input for switching from the remote control mode to another operation mode is received through the key input unit 14 during the remote control mode, the first controller 30 switches to the other operation mode after ending the remote control mode.

When the remote control mode is executed, the first controller 30 transmits an initialization signal to the PC 40, receives an initialization response signal therefrom, and controls the motion information generator 20 to calculate a distance between the mobile communication terminal 10 and the PC 40. The first controller 30 stores reference point coordinates received from the PC 40 in the first memory 18.

When movement by the user is sensed, the first controller 30 controls the motion information generator 20 to generate a motion signal according to the movement. When a motion response signal is received from the PC 40 in response to the motion signal, the first controller 30 stores the motion point coordinates included in the motion response signal in the first memory 18.

The first controller 30 controls the pointer motion information generator 24 to generate pointer motion information using the motion point coordinates included in the motion response signal.

The PC 40 in the remote control system includes the communication interface 42, a second memory 44, a second display 46, a coordinate determiner 48, and a second controller 50.

The communication interface 42 performs a wire/wireless communication function of the PC 40. According to a preferred embodiment of the present invention, the communication interface 42 receives the initialization signal, motion signal and pointer motion information, transmitted from the mobile communication terminal 10, and transmits to the mobile communication terminal 10 the initialization response signal and motion response signal generated in the coordinate determiner 48 of the PC 40.

According to a preferred embodiment of the present invention, the communication interface 42 can be, for example, a display screen. When the communication interface 42 is a display screen, the initialization signal or motion signal transmitted from the mobile communication terminal 10 is received at a certain point on the display screen, converted into an initialization response signal or a motion response signal, and then transmitted back to the mobile communication terminal 10.

The second memory 44, like the first memory 18, can be composed of a program memory and a data memory. Various information necessary for controlling an operation of the PC 40 is stored in the second memory 44.

According to a preferred embodiment of the present invention, the second memory 44 receives an initialization signal from the mobile communication terminal 10, and stores the current position value of the mobile communication terminal 10 based on the initialization signal, and coordinates of a reference point which is the point where the initialization signal has arrived at the PC 40. When the PC 40 receives a motion signal, the second memory 44 stores the current position value, acceleration and angular velocity of the mobile communication terminal 10 based on the motion signal. When coordinates of the motion point are determined by the coordinate determiner 48, the second memory 44 stores the determined motion point coordinates.

In addition, the second memory 44 can store pointer motion information transmitted from the mobile communication terminal 10. The pointer motion information includes motion point coordinates, moving distance, and moving velocity of the pointer, which are the information needed for moving the pointer of PC 40 on the display screen.

Like the first display 16, the second display 46, which can be composed of an LCD, outputs various display data generated in the PC 40. When the LCD is a touch screen, the second display 46 can also serve as an input means.

According to a preferred embodiment of the present invention, when the mobile communication terminal 10 executes the remote control mode, the second display 46 moves the displayed pointer according to the pointer motion information received from the mobile communication terminal 10. The second display 46 can serve as the communication interface 42 that receives the initialization signal and the motion signal. When the second display 46 serves as the communication interface 42, coordinates of the point where the initialization signal or motion signal received from the mobile communication terminal 10 has arrived, become reference point coordinates or motion point coordinates corresponding to the current position value of the mobile communication terminal 10.

The coordinate determiner 48, under the control of the second controller 50, generates an initialization response signal and a motion response signal corresponding to the initialization signal and the motion signal received from the mobile communication terminal 10. Further, the coordinate determiner 48 determines coordinates of a reference point which is the point where the initialization signal is received, and coordinates of a motion point which is the point where the motion signal is received.

When the initialization signal is received, the coordinate determiner 48 determines a reference point corresponding thereto, and generates an initialization response signal including coordinates of the reference point. Since the reference point is a point based on which the pointer of the PC 40 is later displayed according to the movement of the mobile communication terminal 10, the coordinate determiner 48 can determine the coordinates as, for example, (0, 0, 0) corresponding to the coordinates of the reference point on the X, Y and Z axes of a 3D coordinate system, respectively. The coordinate determiner 48 can generate an initialization response signal including display information of the PC 40. The display information is information on the display device of the PC 40 such as resolution information of the PC 40.

When a motion signal is received from the mobile communication terminal 10, the coordinate determiner 48 determines coordinates of the motion point which is the point where the motion signal is received. The coordinate determiner 48 generates a motion response signal including the motion point coordinates, and transmits the motion response signal to the mobile communication terminal 10. According to another preferred embodiment of the present invention, the coordinate determiner 48 can calculate a distance from the reference point to the motion point. The coordinate determiner 48 then generates a motion response signal including the distance from the reference point to the motion point.

The second controller 50 controls the overall operation of the PC 40. According to a preferred embodiment of the present invention, when an initialization signal is received from the mobile communication terminal 10, the second controller 50 perceives that the mobile communication terminal 10 executes the remote control mode. When the initialization signal is received, the second controller 50 controls the coordinate determiner 48 to determine reference point coordinates for the initialization signal, and when the motion signal is received, the second controller 50 controls the coordinate determiner 48 to determine the motion point coordinates for the motion signal.

When the pointer motion information is received from the mobile communication terminal 10, the second controller 50 controls the second display 46 to display the pointer according to the received pointer motion information.

Figure 2:
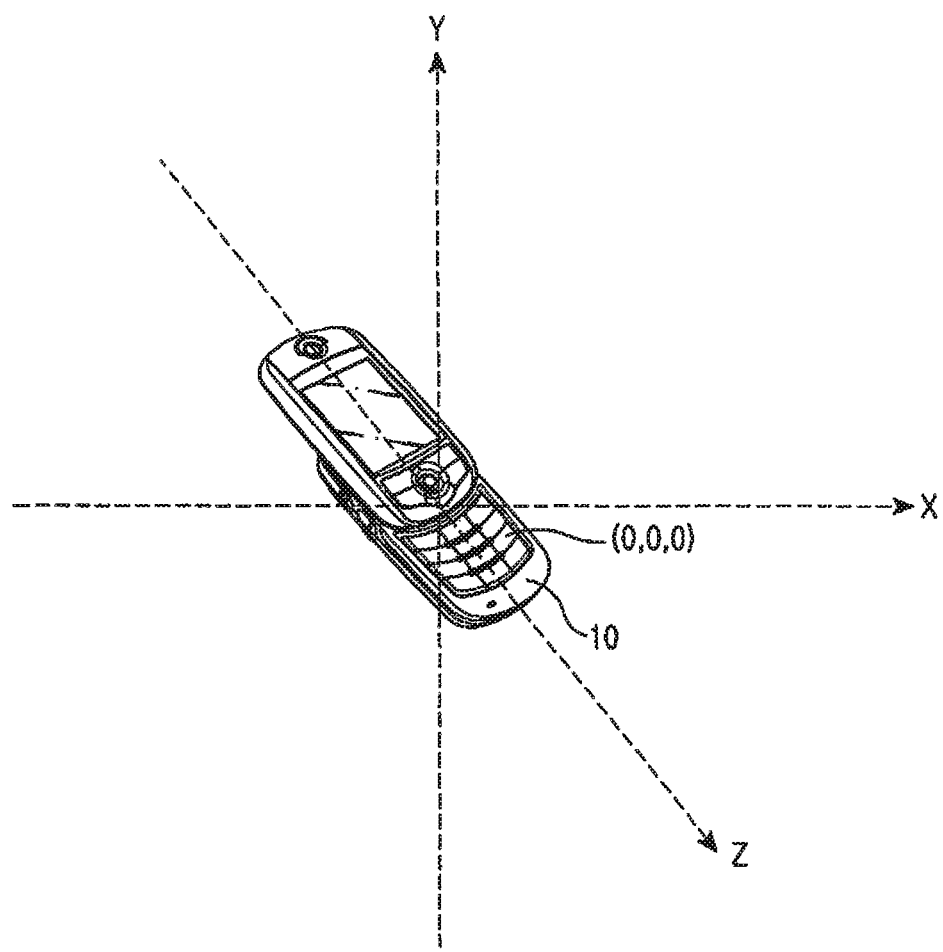
FIG. 2 is a diagram illustrating a mobile communication terminal according to an embodiment of the present invention.

FIG. 2 is a diagram illustrating a mobile communication terminal according to a preferred embodiment of the present invention.

As shown in FIG. 2, the mobile communication terminal 10 has three axes: an X axis, a Y axis, and a Z axis. Accordingly, the mobile communication terminal 10 can receive an input not only from the 2D X/Y-axis plane but also from the 3D screen. Referring to FIG. 2, when the mobile communication terminal 10 moves along the X axis, the pointer of the PC 40 moves left and right on the display screen. When the mobile communication terminal 10 moves along the Y axis, the pointer of the PC 40 moves up and down on the display screen. When the mobile communication terminal 10 moves along the Z axis, the pointer of the PC 40 moves in and out to/from the display screen, with the distance between the mobile communication terminal 10 and the PC 40 getting shorter and longer.

Figure 3:
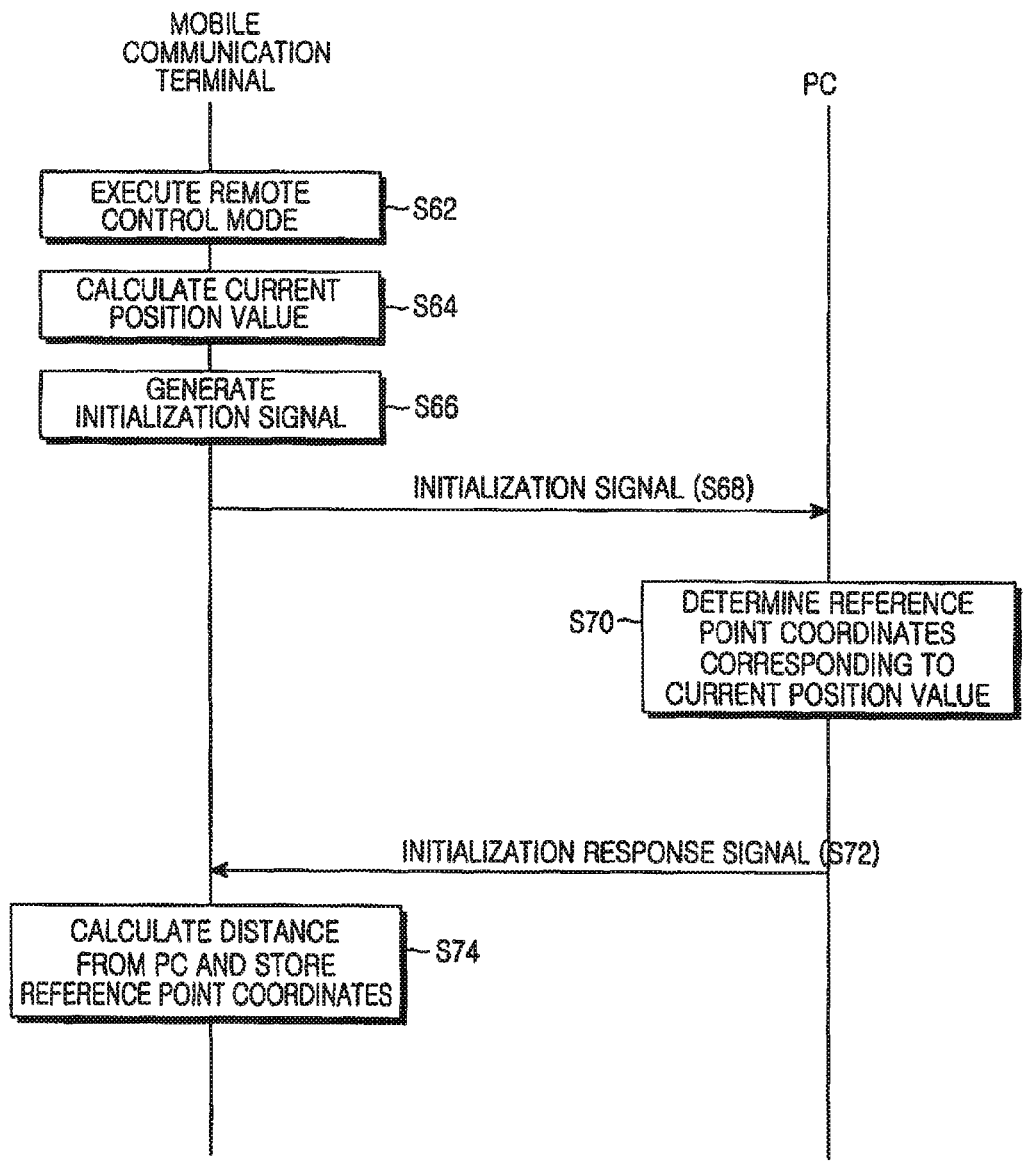
FIG. 3 is a flowchart illustrating a method for determining a reference point between a mobile communication terminal and a PC in a remote control system according to an embodiment of the present invention.

FIG. 3 is a flowchart illustrating a method for determining a reference point between a mobile communication terminal and a PC in a remote control system according to a preferred embodiment of the present invention.

The key input unit 14 of the mobile communication terminal 10 receives a key input for execution of the remote control mode from the user, and the controller 30 executes remote control mode in Step S62. The controller 30 controls the pointer motion information generator 24 of the motion information generator 20 to calculate a current position value of the mobile communication terminal 10 in Step S64.

The current position value of the mobile communication terminal 10, calculated in Step S64, is a value based on which the position value of the mobile communication terminal 10 can be determined when the mobile communication terminal 10 is moved by the user after initialization for execution of the remote control mode. Therefore, if it is assumed in Step S64 that the current position value of the mobile communication terminal 10 is indicated by X/Y/Z-axis 3D coordinates, it is preferable that the current position value is designated as the origin of (0, 0, 0). In this case, it is assumed that the X axis, the Y axis and the Z axis in the mobile communication terminal 10 are different from the X axis, the Y axis and the Z axis in the PC 40.

The signal generator 22 generates an initialization signal in Step S66. The initialization signal is a signal generated to determine particular coordinates on the display screen of the PC 40, which correspond to the current position value calculated in Step S64, in order to map each position to which mobile communication terminal 10 moves, to the position on the display screen of the PC 40.

The PC 40 receives the initialization signal from the mobile communication terminal 10 in Step S68, and determines reference point coordinates corresponding to the current position value in Step S70. The initialization signal transmitted from the mobile communication terminal 10 is received at the PC 40 in such a manner that it arrives at a certain point on the display screen, and the PC 40 determines the point where the initialization signal has arrived, as a reference point, and transmits the coordinates to the mobile communication terminal 10. In this case, the reference point coordinates can be, for example, any one of the multiple pixels distributed on the display screen of the PC 40.

According to a preferred embodiment of the present invention, the PC 40 can determine coordinates of the point where the initialization signal of the mobile communication terminal 10 is received as (0, 0, 0), and recalculate coordinates for each point where the pointer is located, using the reference point.

The PC 40 transmits an initialization response signal including the reference point coordinates to the mobile communication terminal 10 in Step S72. According to a preferred embodiment of the present invention, the PC 40 transmits the initialization response signal including the display information. The display information can include screen resolution of the PC 40, and driver information for the display device of the PC 40.

The mobile communication terminal 10 receives the initialization response signal from the PC 40 in Step S72. The mobile communication terminal 10 calculates the distance from the PC 40, and stores reference point coordinates in Step S74.

The pointer motion information generator 24, under the control of the first controller 30, measures the time from the transmission time of the initialization signal to the reception time of the initialization response signal, and calculates the distance between the mobile communication terminal 10 and the PC 40 using the measured time.

When the initialization signal generated in the signal generator 22 arrives at the PC 40, it is processed into an initialization response signal and then transmitted back to the mobile communication terminal 10. The time for which the initialization signal is processed into the initialization response signal is negligibly shorter than the time for which the initialization signal or the initialization response signal is delivered. According to a preferred embodiment of the present invention, the time for which the initialization signal arrives at the PC 40 from the mobile communication terminal 10 is equal to the time for which the initialization response signal arrives at the mobile communication terminal 10 from the PC 40. Therefore, the time for which the initialization signal is transmitted to the PC 40 and then its associated initialization response signal is received at the mobile communication terminal 10, can be regarded as the round-trip time between the mobile communication terminal 10 and the PC 40 for the initialization signal.

Since the pointer motion information generator 24 knows the time required when the initialization signal makes a round trip between the mobile communication terminal 10 and the PC 40, it can find the distance between the mobile communication terminal 10 and the PC 40. Here, a velocity of the initialization signal is previously stored in the first memory 18, and the initialization signal can be, for example, infrared rays and ultrasonic waves.

Figure 4:
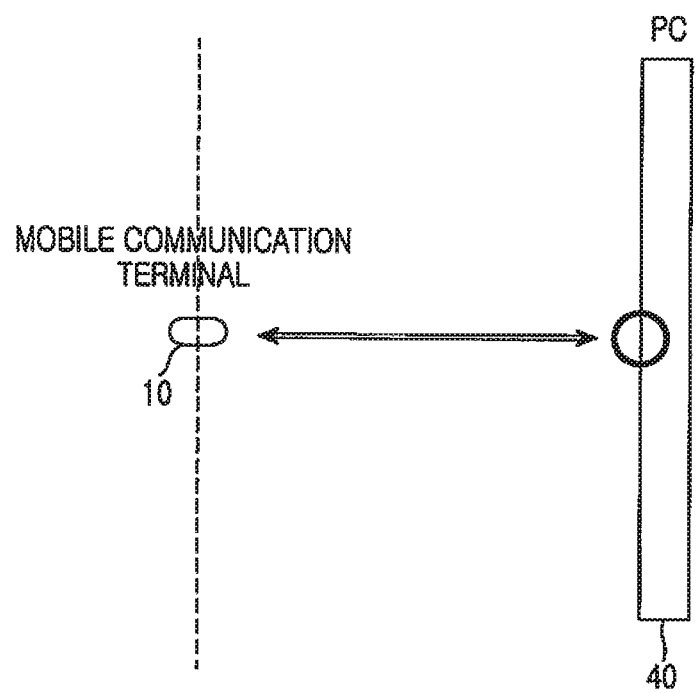
FIG. 4 is a diagram illustrating a mobile communication terminal and a PC, for determining reference point coordinates in a remote control system according to an embodiment of the present invention.

FIG. 4 is a diagram illustrating a mobile communication terminal and a PC, for determining reference point coordinates in a remote control system according to a preferred embodiment of the present invention.

In the drawing, the mobile communication terminal 10 and the PC 40 both use the X/Y/Z-axis 3D coordinate system.

The mobile communication terminal 10 transmits an initialization signal, and the PC 40 receives the initialization signal. The PC 40 determines the point where the initialization signal is received, as a reference point, and then determines the coordinates of the reference point. Preferably, the coordinate determiner 48 determines the reference point coordinates as (0, 0, 0). The mobile communication terminal 10 then receives an initialization response signal including the reference point coordinates, transmitted from the PC 40. Preferably, the mobile communication terminal 10 receives the initialization response signal in the position where it transmitted the initialization signal.

Shown in FIG. 4 is a diagram for the case when the communication interface 42 of the PC 40 that received the initialization signal from the mobile communication terminal 10 is a display screen. Therefore, the coordinate determiner 48 determines the point where the initialization signal has arrived on the display screen of the PC 40 as a reference point, and transmits coordinates of the determined reference point to the mobile communication terminal 10.

The mobile communication terminal 10 receives the initialization response signal transmitted from the PC 40 in the position where it transmitted the initialization signal, and measures the time for which the initialization signal is transmitted from the mobile communication terminal 10 to the PC 40, and the time for which the initialization response signal is transmitted from the PC 40 to the mobile communication terminal 10. The mobile communication terminal 10 then calculates the distance between the mobile communication terminal 10 and the PC 40 using the measured time, and stores it in the first memory 18.

The distance between the mobile communication terminal 10 and the PC 40 in the process of determining a reference point using the initialization signal becomes an origin point based on which the first controller 30 can later determine whether the mobile communication terminal 10 has become closer to or further away from the PC 40 when the mobile communication terminal 10 is moved by the user. The distance between the mobile communication terminal 10 and the PC 40 in the process of determining the reference point coordinates using the initialization signal will be referred to herein as a "reference distance".

According to the present invention, when the distance between the mobile communication terminal 10 and the PC 40 is further than the reference distance, the mobile communication terminal 10 generates pointer motion information that displays the pointer of the PC 40 as if it moves in the opposite direction (e.g., +Z axis) of the direction of the mobile communication terminal 10. On the contrary, when the distance between the mobile communication terminal 10 and the PC 40 is closer than the reference distance, the mobile communication terminal 10 generates pointer motion information that displays the pointer of the PC 40 as if it moves toward the direction (e.g., −Z axis) of the position where the mobile communication terminal 10 is located.

Figure 5:
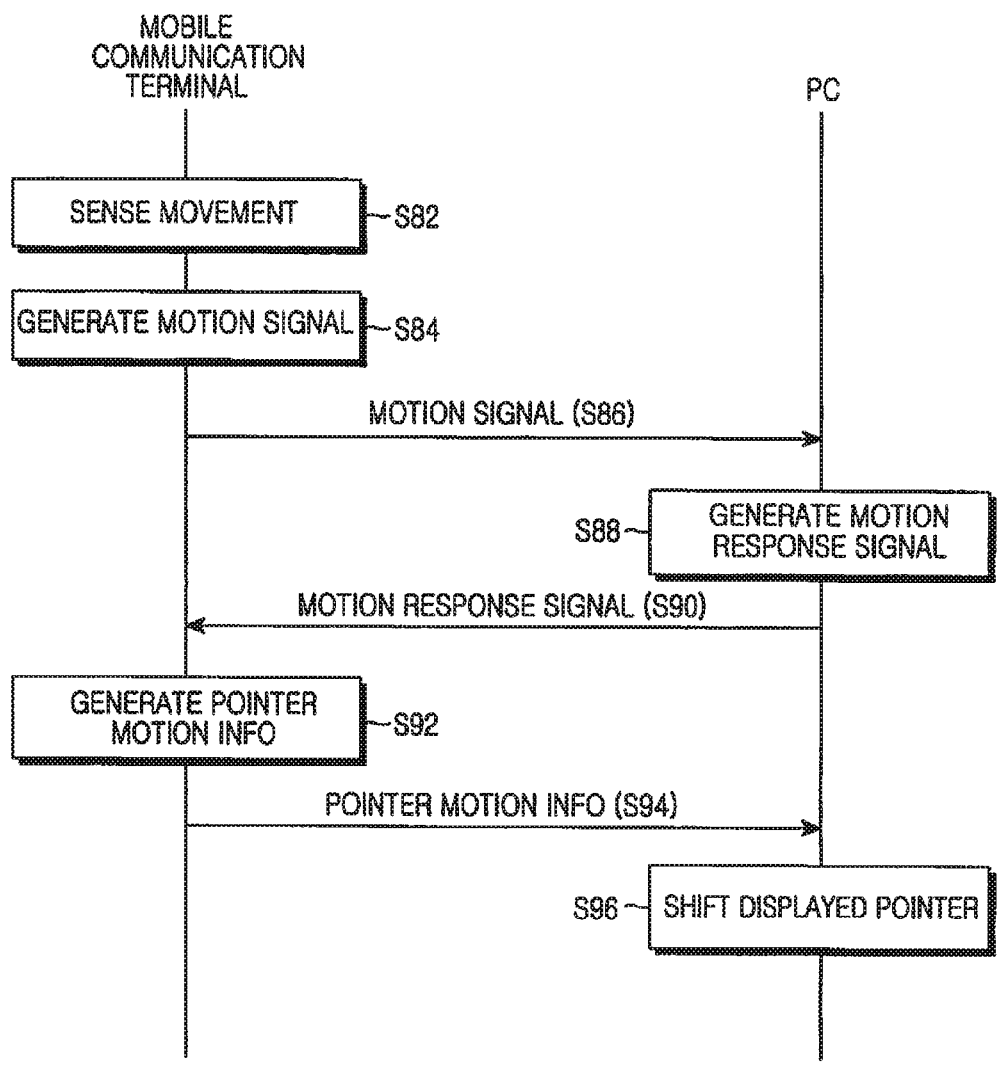
FIG. 5 is a flowchart illustrating a method in which a mobile communication terminal remote-controls a PC in a remote control system according to an embodiment of the present invention.

FIG. 5 is a flowchart illustrating a method in which a mobile communication terminal remote-controls a PC in a remote control system according to a preferred embodiment of the present invention.

It is assumed in FIG. 5 that the mobile communication terminal 10 is now executing the remote control mode, and reference point coordinates of the PC 40 and a position value of the mobile communication terminal 10, which corresponds to the reference point coordinates, are previously stored in the first memory 18 and the second memory 44.

The first controller 30 senses a movement of the mobile communication terminal 10 in Step S82. The movement of the mobile communication terminal 10 indicates a change in position of the mobile communication terminal 10 from a first position to a second position by the user, or a change in the angle of the mobile communication terminal 10 with respect to the PC 40 from a first angle to a second angle. In the remote control mode, the movement of the mobile communication terminal 10 is sensed through at least one of a position sensor, an acceleration sensor and a gyro sensor.

The signal generator 22 generates a motion signal under the control of the first controller 30 in Step S84. The motion signal is a signal generated to move the pointer of the PC 40 according to the movement of the mobile communication terminal 10. The signal generator 22 can generate a motion signal including the acceleration, the angular velocity and the current position value of the mobile communication terminal 10.

The mobile communication terminal 10 transmits the generated motion signal to the PC 40 in Step S86. The PC 40 receives the motion signal, and generates its associated motion response signal in Step S88. The coordinate determiner 48 of the PC 40 can generate a motion response signal including pointer motion point coordinates.

The PC 40 transmits the motion response signal to the mobile communication terminal 10 in Step S90, and the mobile communication terminal 10 receives the motion response signal and generates pointer motion information depending thereon in Step S92. The pointer motion information is information indicating how the pointer of the PC 40 should move in reply to the movement of the mobile communication terminal 10. The PC 40 receives pointer motion information from the mobile communication terminal 10 in Step S94, and moves the displayed pointer according to the received pointer motion information in Step S96.

Figure 6:
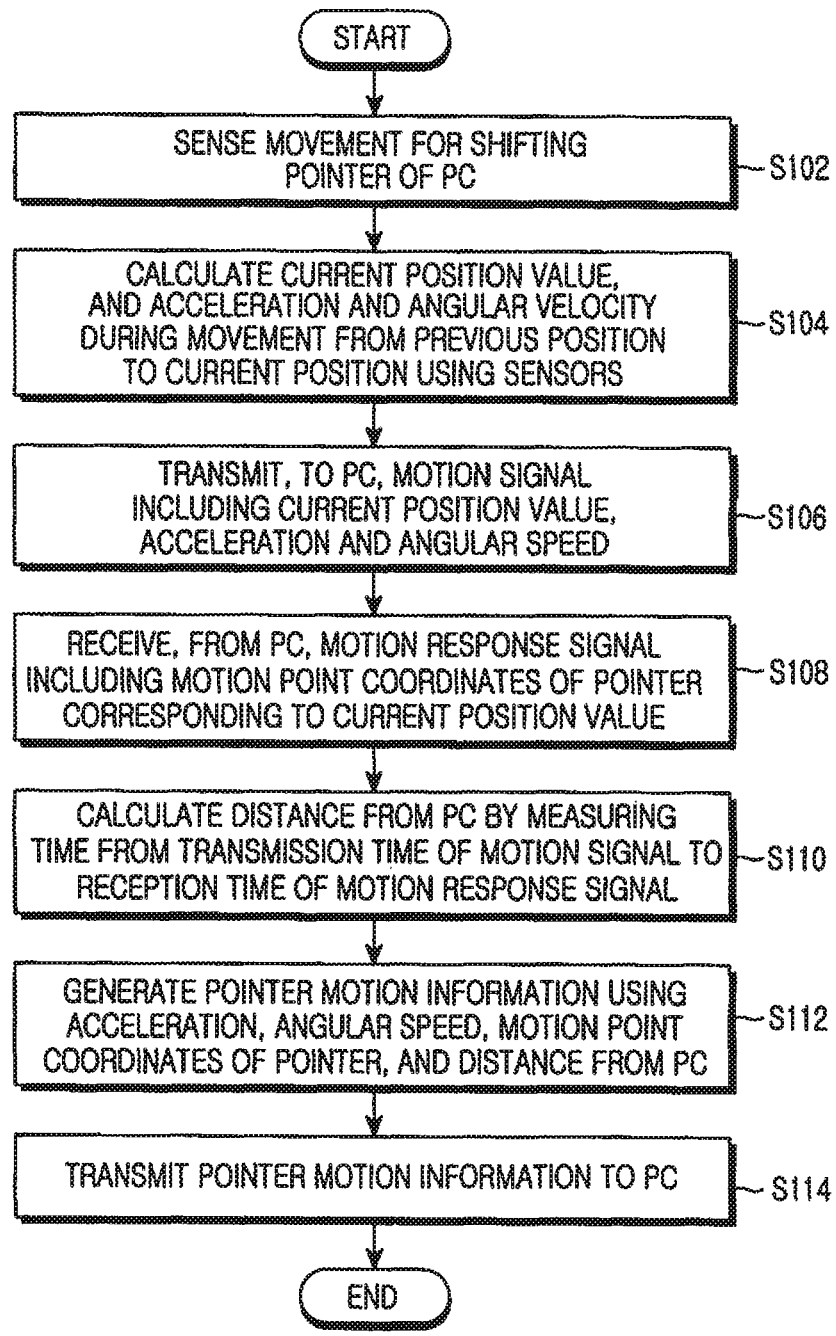
FIG. 6 is a flowchart illustrating a method in which a mobile communication terminal remote-controls a PC in a remote control system according to an embodiment of the present invention.

FIG. 6 is a flowchart illustrating a method in which a mobile communication terminal remote-controls a PC in a remote control system according to a preferred embodiment of the present invention.

The mobile communication terminal 10 senses a movement for shifting a pointer of the PC 40 in Step S102. Using the sensors, the mobile communication terminal 10 calculates a its current position value, and the acceleration and the angular velocity obtained when it moves from the previous position to the current position in Step S104. The first controller 30 controls the position sensor to sense the current position of the mobile communication terminal 10, and senses a moving velocity and an acceleration based on the moving velocity when the mobile communication terminal 10 moves from the previous position to the current position, using the acceleration sensor. Using the gyro sensor, the first controller 30 can sense whether a body of the mobile communication terminal 10 is inclined as compared with the previous position.

The signal generator 22 generates a motion signal including the current position value, the acceleration and the angular velocity of the mobile communication terminal 10, and the first controller 30 transmits the generated motion signal to the PC 40 via the transceiver 12 in Step S106.

Upon receipt of the motion signal from the mobile communication terminal 10, the PC 40 determines pointer motion point coordinates according to the current position value of the mobile communication terminal 10, and generates a motion response signal including the pointer motion point coordinates. The PC 40 transmits the generated motion response signal to the mobile communication terminal 10 through the communication interface 42.

The transceiver 12 in the mobile communication terminal 10 receives from the PC 40 the motion response signal including the motion point coordinates of the pointer, which correspond to the current position value in Step S108.

The pointer motion information generator 24 calculates a distance from the PC 40 by measuring the time from the transmission time of the motion signal to the reception time of the motion response signal in Step S110. By calculating the distance from the PC 40, the mobile communication terminal 10 can determine if the distance from the PC 40 in its current position is longer or shorter than the distance from the PC 40 in its previous position. In addition, if the time from the transmission time of the motion signal to the reception time of the motion response signal in the current position is equal to that in the previous position, it is obvious that the distance between the mobile communication terminal 10 and the PC 40 is not changed.

The pointer motion information generator 24 generates pointer motion information using acceleration, angular velocity, motion point coordinates of the pointer, and distance from the PC 40 in Step S112. The pointer motion information generator 24 determines a velocity of the mobile communication terminal 10 using the acceleration of the mobile communication terminal 10 when the pointer of the PC 40 has moved. In addition, the pointer motion information generator 24 determines an angle of the mobile communication terminal 10 using the angular velocity when the pointer moves on the display screen. Using the distance from the PC 40, the pointer motion information generator 24 determines whether it will shift the pointer forward or backward on the display screen when the pointer has moved to the motion point coordinates corresponding to the current position value from the motion point coordinates corresponding to the previous position value of the mobile communication terminal 10. For example, when the distance between the mobile communication terminal 10 and the PC 40 becomes shorter, the pointer motion information generator 24 determines to display the motion point as if it moves back on the display screen; and when the distance between the mobile communication terminal 10 and the PC 40 becomes longer, the pointer motion information generator 24 determines to display the pointer as if it pops out.

The mobile communication terminal 10 transmits the pointer motion information to the PC 40 in Step S114. Upon receipt of the pointer motion information, the PC 40 can determine how it will move the displayed pointer according to the movement of the mobile communication terminal 10. The PC 40 controls the second display 46 to display the pointer according to the pointer motion signal.

According to another preferred embodiment of the present invention, the PC 40 can generate in Step S106 the pointer motion information using the current position value, the acceleration and the angular velocity received from the mobile communication terminal 10 and the motion point coordinates determined according to the current position value.

Figure 7A:
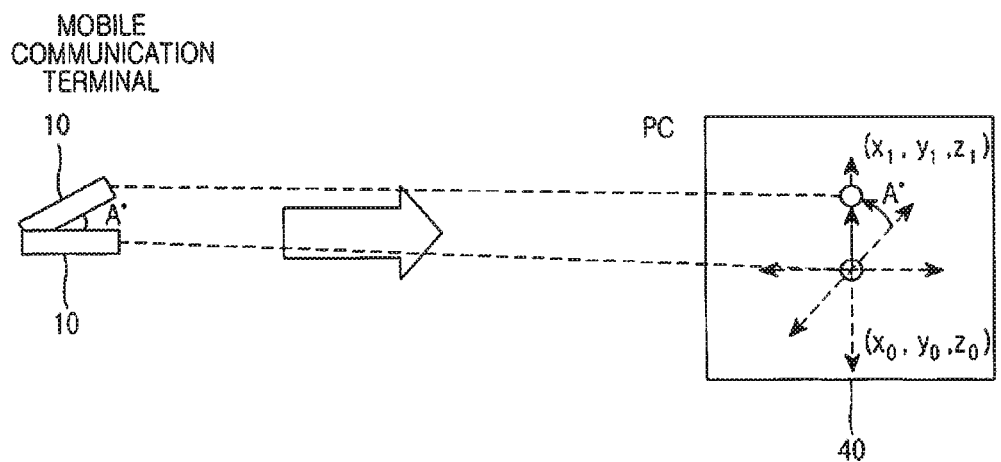
FIGS. 7A and 7B are diagrams illustrating shifting of a pointer of a PC in a remote control system according to an embodiment of the present invention.
Figure 7B:
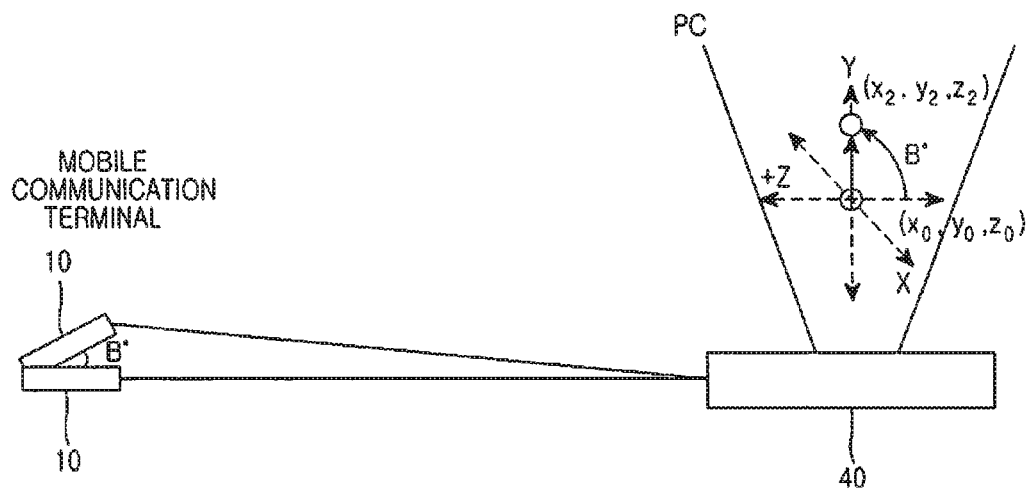

FIGS. 7A and 7B are diagrams illustrating shifting of a pointer of a PC in a remote control system according to a preferred embodiment of the present invention.

FIG. 7A illustrates pointer shifting when the PC 40 has a 2D display screen, and FIG. 7B illustrates pointer shifting when the PC 40 has a 3D display screen.

It is assumed in FIG. 7A that an angle of the mobile communication terminal 10 is 0° when coordinates of the point where the motion signal transmitted from the mobile communication terminal 10 has arrived at the PC 40 are ($x_0$, $y_0$, $z_0$), and an angle of the mobile communication terminal 10 is A° when coordinates of the point where the motion signal has arrived are ($x_1$, $y_1$, $z_1$).

Even though only the angle of the mobile communication terminal 10 is changed, the remote control system according to the present invention considers that the mobile communication terminal 10 has moved. Therefore, in FIG. 7A, the PC 40 shifts the displayed pointer according to the movement of the mobile communication terminal 10, considering that the mobile communication terminal 10 has been moved by the user.

The distance between the mobile communication terminal 10 and the PC 40 for the angle 0° is different from the distance between the mobile communication terminal 10 and the PC 40 for the angle A°. Since the mobile communication terminal 10 is inclined by A°, its distance from the PC 40 gets longer as compared with when the mobile communication terminal 10 is inclined by 0°. Therefore, although not shown in FIG. 7A, the PC 40 should incline the displayed pointer toward the +Z axis. Since the PC 40 has a 2D display screen, the PC 40 displays the pointer as if it pops out toward the mobile communication terminal 10 at the point where it is inclined by A° toward the +Z axis at the coordinates of ($x_0$, $y_0$, $z_0$). In this manner, the coordinates of the pointer, which are calculated as the mobile communication terminal 10 moves, are ($x_1$, $y_1$, $z_1$).

Likewise, it is also assumed in FIG. 7B that an angle of the mobile communication terminal 10 is 0° when coordinates of the point where the motion signal transmitted from the mobile communication terminal 10 has arrived at the PC 40 are ($x_0$, $y_0$, $z_0$), and an angle of the mobile communication terminal 10 is B° when coordinates of the point where the motion signal has arrived are ($x_2$, $y_2$, $z_2$).

Even in FIG. 7B, since the acceleration, the angular velocity and the current position value are changed as the angle of the mobile communication terminal 10 is inclined by B°, the PC 40 shifts the displayed pointer according thereto. Since the PC 40 has a 3D display screen, the pointer having coordinates of ($x_2$, $y_2$, $z_2$) is displayed at the point where it is inclined by B° toward the +Z axis with respect to the pointer having coordinates of ($x_0$, $y_0$, $z_0$).

Figure 8A:
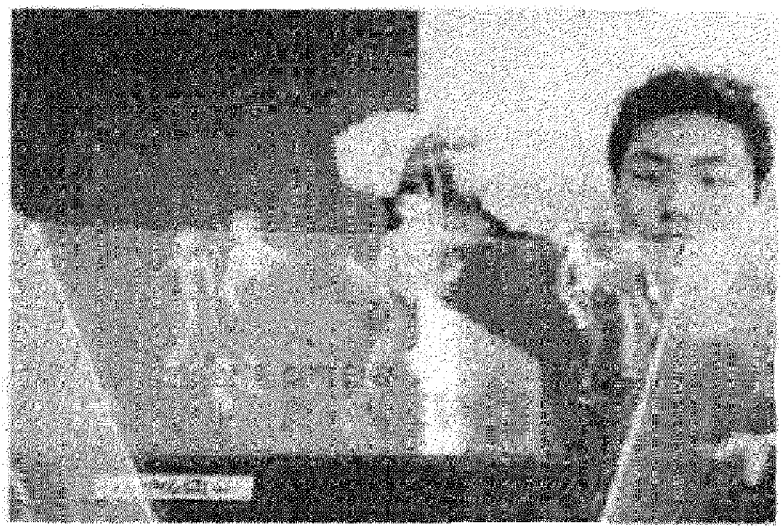
FIGS. 8A and 8B are diagrams illustrating games realized in a remote control system according to an embodiment of the present invention.
Figure 8B:
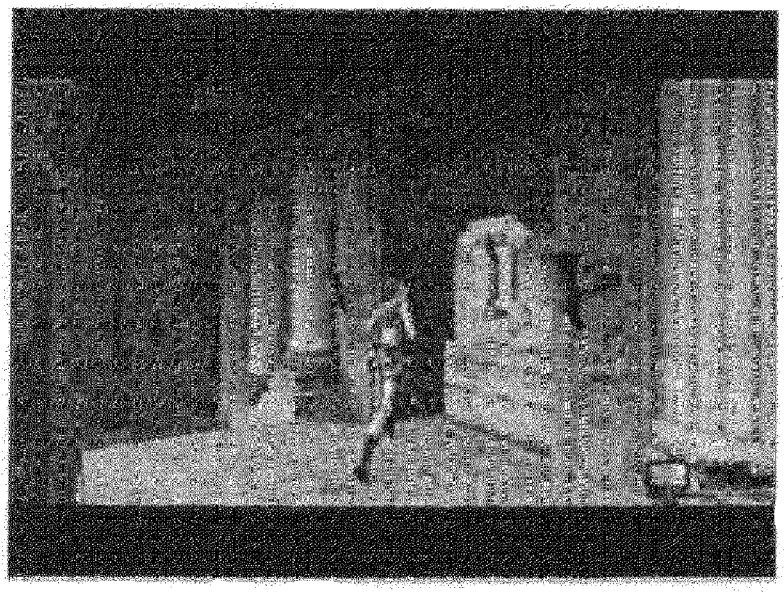

FIGS. 8A and 8B are diagrams illustrating games realized in a remote control system according to a preferred embodiment of the present invention.

FIG. 8A illustrates a display screen of the PC 40, on which a 3D game is played, and FIG. 8B illustrates a display screen of the PC 40, on which a 2D game is played.

Referring to FIGS. 8A and 8B, the user can shift the pointer of the PC 40 to his/her desired position by applying a motion to the mobile communication terminal 10. The user not only can shift the pointer to the desired position, but also adjust a moving velocity of the pointer, while viewing the 3D display screen of FIG. 8A or the 2D display screen of FIG. 8B. The user can move the mobile communication terminal 10 fast or slow, so the pointer can shift at the velocity corresponding thereto.

According to a preferred embodiment of the present invention, a predetermined command for the corresponding point where the pointer is positioned can be sent from the PC 40 to the mobile communication terminal 10 to be executed in the mobile communication terminal 10. For example, when the pointer of the PC 40 arrives at a predetermined point, the mobile communication terminal 10 can generate a vibration, or the voice data stored in the first memory 18 can be played back.

Figure 9:
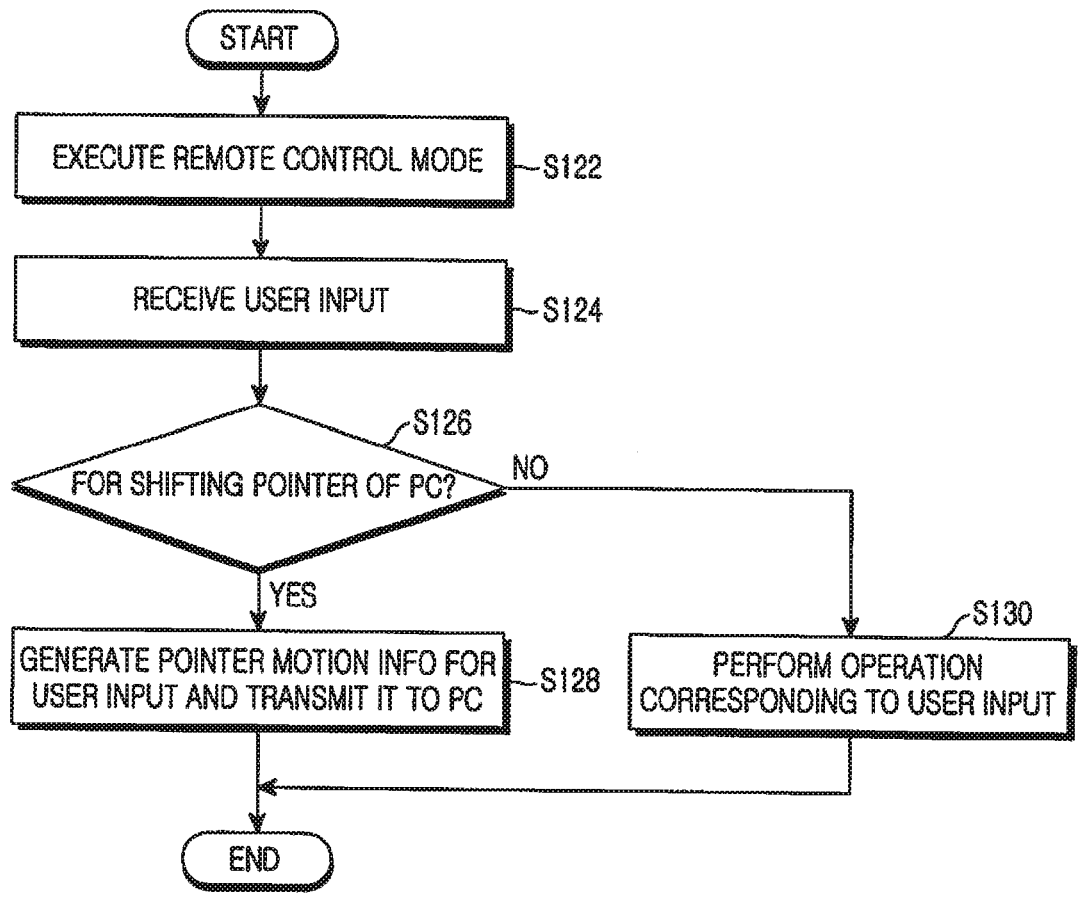
FIG. 9 is a flowchart illustrating a method in which a mobile communication terminal remote-controls a PC in a remote control system according to an embodiment of the present invention.

FIG. 9 is a flowchart illustrating a method in which a mobile communication terminal remote-controls a PC in a remote control system according to a preferred embodiment of the present invention.

The first controller 30 of the mobile communication terminal 10 executes the remote control mode in Step S122, and receives a user input through the key input unit 14 in Step S124.

The first controller 30 determines if the user input received in Step S124 is for shifting the pointer of the PC 40 in Step S126. If the user input is for shifting the pointer of the PC 40, the first controller 30 controls the mobile communication terminal 10 to generate pointer motion information for the user input and to transmit it to the PC 40 in Step S128.

However, if the user input is not for shifting the pointer of the PC 40, the first controller 30 performs an operation corresponding to the user input in Step S130. The operation can include performing an operation corresponding to the point where the pointer is positioned on the display screen of the PC 40. According to a preferred embodiment of the present invention, the first controller 30 can control the signal generator 22 to generate a command for performing an operation corresponding to the point where the pointer is positioned, and send the generated command to the PC 40.

As is apparent from the foregoing description, the present invention provides a remote control method for remote-controlling a target apparatus that displays a 3D display screen, using a mobile communication terminal, and a remote control system thereof.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile communication terminal comprising:
    a motion sensor;
    a transceiver configured for communication with a target apparatus including a display screen; and
    a processing unit configured to:
        establish, via the transceiver, a communication link with the target apparatus having the display screen adapted to visualize an object,
        detect an amount of displacement of the mobile communication terminal, via the motion sensor,
        generate motion information using the amount of displacement of the mobile communication terminal, and
        transmit the motion information to the target apparatus,
    wherein the motion information corresponds to movement data of the object and the amount of displacement is detected based on at least one of current position information, acceleration information and angular velocity information of the mobile communication terminal.

2. The mobile communication terminal of claim 1, wherein the motion information is generated using the amount of displacement of the mobile communication terminal and a distance between the mobile communication terminal and the target apparatus.

3. The mobile communication terminal of claim 2, wherein the processing unit compares the current position information of the mobile communication terminal with previous position information based on a previous position of the mobile communication terminal, and determines whether the distance between the mobile communication terminal and the target apparatus is changed according to a result of the comparison.

4. The mobile communication terminal of claim 2, wherein the processing unit determines the distance between the mobile communication terminal and the target apparatus based on a time from a transmission time of a first signal to a reception time of a second signal.

5. The mobile communication terminal of claim 1, wherein the motion sensor comprises a position sensor for measuring the current position information of the mobile communication terminal, an acceleration sensor for measuring the acceleration information, and a gyro sensor for measuring the angular velocity information.

6. The mobile communication terminal of claim 1, wherein, if the mobile communication terminal is to operate in a remote control mode, the transceiver transmits an initialization signal to determine a reference point at the target apparatus and receives an initialization response signal corresponding to the initialization signal from the target apparatus.

7. A remote control method for remote-controlling a target apparatus using a mobile communication terminal comprising:
    establishing a communication link with the target apparatus having a display screen adapted to visualize an object;
    detecting an amount of displacement of the mobile communication terminal;
    generating motion information using the amount of displacement of the mobile communication terminal; and
    transmitting the motion information to the target apparatus, wherein the motion information corresponds to movement data of the object and the amount of displacement is detected based on at least one of current position information, acceleration information and angular velocity information of the mobile communication terminal.

8. The remote control method of claim 7, wherein the motion information is generated using the amount of displacement of the mobile communication terminal and a distance between the mobile communication terminal and the target apparatus.

9. The remote control method of claim 8, further comprising:
   comparing the current position information of the mobile communication terminal with previous position information based on a previous position of the mobile communication terminal, and determining whether the distance between the mobile communication terminal and the target apparatus is changed according to a result of the comparison.

10. The remote control method of claim 8, further comprising:
    determining the distance between the mobile communication terminal and the target apparatus based on a time from a transmission time of a first signal to a reception time of a second signal.

11. The remote control method of claim 7, further comprising:
    transmitting an initialization signal to determine a reference point at the target apparatus; and
    receiving an initialization response signal corresponding to the initialization signal from the target apparatus.

12. A target apparatus remote-controlled by a mobile communication terminal comprising:
    a transceiver configured for communication with the mobile communication terminal;
    a display to visualize an object; and
    a processing unit configured to:
       establish, via the transceiver, a communication link with the mobile communication terminal,
       receive data corresponding to an amount of displacement of the mobile communication terminal,
       generate motion information using the amount of displacement of the mobile communication terminal, and
       move the object according to the motion information,
    wherein the motion information corresponds to movement data of the object, and the amount of displacement is detected based on at least one of current position information, acceleration information and angular velocity information of the mobile communication terminal.

13. The target apparatus of claim 12, wherein the motion information is generated using the amount of displacement of the mobile communication terminal and a distance between the mobile communication terminal and the target apparatus.

14. The target apparatus of claim 12, wherein, if the target apparatus is to operate in the remote control mode, the transceiver receives an initialization signal to determine a reference point at the target apparatus and transmits an initialization response signal corresponding to the initialization signal to the mobile communication terminal.

15. A remote control method for remote-controlling a target apparatus using a mobile communication terminal comprising:
    establishing a communication link with the mobile communication terminal;
    receiving data corresponding to an amount of displacement of the mobile communication terminal;
    generating motion information generated using the amount of displacement of the mobile communication terminal; and
    moving an object displayed on a display of the target apparatus according to the motion information,
    wherein the motion information corresponds to movement data of the object, and the amount of displacement is detected based on at least one of current position information, acceleration information and angular velocity information of the mobile communication terminal.

16. The remote control method of claim 15, wherein the motion information is generated using the amount of displacement of the mobile communication terminal and a distance between the mobile communication terminal and the target apparatus.

17. The remote control method of claim 15, further comprising:
    if the target apparatus is to operate in the remote control mode, receiving an initialization signal to determine a reference point at the target apparatus; and transmitting an initialization response signal corresponding to the initialization signal to the mobile communication terminal.

* * * * *